US010942605B2

(12) United States Patent
Bokma et al.

(10) Patent No.: US 10,942,605 B2
(45) Date of Patent: Mar. 9, 2021

(54) METHOD OF OPTIMIZING TOUCH DETECTION

(71) Applicant: Apple Inc., Cupertino, CA (US)

(72) Inventors: Louis W. Bokma, San Jose, CA (US); Sean E. O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/198,307

(22) Filed: Nov. 21, 2018

(65) Prior Publication Data

US 2019/0095036 A1  Mar. 28, 2019

Related U.S. Application Data

(63) Continuation of application No. 14/859,021, filed on Sep. 18, 2015, now Pat. No. 10,152,162.

(60) Provisional application No. 62/162,028, filed on May 15, 2015.

(51) Int. Cl.
*G06F 3/041* (2006.01)
*G06F 3/044* (2006.01)
*G06F 1/16* (2006.01)

(52) U.S. Cl.
CPC .......... *G06F 3/04186* (2019.05); *G06F 1/163* (2013.01); *G06F 1/1684* (2013.01); *G06F 3/044* (2013.01); *G06F 2203/04104* (2013.01)

(58) Field of Classification Search
CPC ............................ G06F 3/0416; G06F 3/04186
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Gustavo Polo
(74) *Attorney, Agent, or Firm* — Kubota & Basol LLP

(57) ABSTRACT

A computer-implemented method is disclosed. The method includes: receiving a first signal from a first sensor of the device, the first signal indicative of a grounding condition of the device; setting one or more touch detection thresholds based on the grounding condition; receiving a touch signal from a touch sensor of the device, the touch signal indicative of a touch by an object; and determining whether one or more parameters of the touch signal exceeds the one or more touch detection thresholds.

20 Claims, 6 Drawing Sheets

(56) References Cited

U.S. PATENT DOCUMENTS

| | | |
|---|---|---|
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,599,169 B2 | 12/2013 | Nascimento |
| 9,141,208 B2 | 9/2015 | Park et al. |
| 10,152,162 B1 | 12/2018 | Bokma et al. |
| 2006/0197753 A1 | 9/2006 | Hotelling |
| 2010/0257490 A1* | 10/2010 | Lyon .................... G06F 3/0488 715/863 |
| 2011/0061949 A1 | 3/2011 | Krah et al. |
| 2012/0098766 A1 | 4/2012 | Dippel et al. |
| 2012/0293447 A1 | 11/2012 | Heng et al. |
| 2013/0173211 A1 | 7/2013 | Hoch et al. |
| 2014/0118011 A1 | 5/2014 | Burger et al. |
| 2014/0184561 A1 | 7/2014 | Kim |
| 2014/0306924 A1 | 10/2014 | Lin et al. |
| 2014/0306926 A1 | 10/2014 | Lee |
| 2015/0277609 A1 | 10/2015 | Jung et al. |
| 2015/0309604 A1 | 10/2015 | Lai et al. |
| 2016/0117043 A1 | 4/2016 | Kim |
| 2017/0090511 A1 | 3/2017 | Rudolph et al. |
| 2019/0079613 A1 | 3/2019 | Zhang et al. |

OTHER PUBLICATIONS

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Ex Parte Quayle Action received for U.S. Appl. No. 15/701,069, dated Oct. 24, 2019, 5 pages.

Non-Final Office Action received for U.S. Appl. No. 14/859,021, dated Aug. 2, 2017, 9 pages.

Non-Final Office Action received for U.S. Appl. No. 14/859,021, dated Mar. 22, 2018, 10 pages.

Non-Final Office Action received for U.S. Appl. No. 15/701,069, dated Jun. 24, 2019, 12 pages.

Notice of Allowance received for U.S. Appl. No. 14/859,021, dated Aug. 14, 2018, 6 pages.

Notice of Allowance received for U.S. Appl. No. 15/701,069, dated Nov. 4, 2019, 10 pages.

* cited by examiner

METHOD OF OPTIMIZING TOUCH DETECTION

CROSS-REFERENCE TO RELATED APPLICATION

This application is a continuation of U.S. patent application Ser. No. 14/859,021 filed on Sep. 18, 2015, which claims benefit of U.S. Provisional Application No. 62/162,028, filed May 15, 2015, which is hereby incorporated by reference in its entirety.

FIELD

This relates generally to touch detection by a touch sensor panel, and more particularly, to a method of adjusting the touch sensitivity of a touch sensor panel based on the grounding condition of the touch object.

BACKGROUND

In recent years, touch sensor panels, touch screens, and the like have become available as input devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel, that can be positioned partially or fully behind the touch sensor panel so that the touch-sensitive surface can cover at least a portion of the viewable area of the display device. Touch screens can allow a user to perform various functions by touching the touch sensor panel using a finger, stylus, or other object at a location often dictated by a user interface (UI) being displayed by the display device. In general, touch screens can recognize a touch event and the position of the touch event on the touch sensor panel, and a computing system can then interpret the touch event in accordance with the display appearing at the time of the touch event, and thereafter can perform one or more actions based on the touch event.

Touch sensor panels can include an array of touch sensors capable of detecting touch events (the touching by an object such as a finger upon a touch-sensitive surface). Some current touch panels are able to detect multiple touches (e.g., the touching of multiple fingers upon a touch-sensitive surface at distinct locations at about the same time) and near touches (e.g., fingers within the near-field detection capabilities of their touch sensors), and identify and track their locations.

It is desirable to optimize the touch sensitivity of a touch sensor panel to accurately determine the location and/or magnitude of each intended touch on the touch sensor panel while preventing false touches from being registered.

SUMMARY

In general, this disclosure relates to a system and method of adjusting the touch sensitivity of a touch sensor panel based on the grounding condition of the touch object. A well-grounded touch object (e.g., a user's finger) typically generates stronger touch signals on a touch sensor panel than a poorly grounded or isolated touch object. When the grounding condition of the touch object is unknown, the touch device can be programmed to recognize and process a wide range of touch signals including relatively weak signals from, for example, a poorly grounded or isolated touch object. This can involve setting the touch detection threshold low enough to register touches by poorly grounded or isolated touch objects. However, one of the drawbacks is that the low threshold may also allow false or unintended touches to be captured and processed. In various embodiments, the touch detection threshold can be based on one or more object detection thresholds, such as those corresponding to volume, density, and ellipse radii, each of which is described in more detail below.

In various embodiments of the present disclosure, the touch device can include one or more sensors that provide signals indicative of a grounding condition of the device (e.g., whether the device is in contact with a well-grounded touch object). That the touch object (e.g., a user) is grounded to the touch device (e.g., a wearable device) can depend on how much capacitive coupling there is from the user to the device chassis. With certain wearable devices (e.g., ones with thick plastic, minimal conductive material, and/or a touch screen distant from wrist), the user will not be as grounded as others (e.g., ones with metal chassis). Based on the determined (or inferred) grounding condition of the touch object, the processor of the touch device can adjust one or more touch detection threshold(s) to achieve improved touch sensitivity that can reduce unintended or false touches from being processed as user input. In addition, knowing whether the touch object (e.g., user) is in a grounded or ungrounded state will reduce the variability in the touch features. This in turn can allow for more accurate touch recognition. In one embodiment, the touch device can be a wearable device that includes a sensor designed to determine whether or not the device is being worn by or otherwise in contact with a person. If the touch device is detected to be worn by or otherwise in contact with the person, the person can be presumed to be well grounded and the touch device can raise one or more thresholds for registering a touch because it does not have to worry about not picking up weak touch signals from ungrounded touches. This can allow touch detection to be more selective, thus reducing unintended and/or false touches such as those caused by grounded water droplets on the touch surface.

DETAILED DESCRIPTION OF THE PREFERRED EMBODIMENTS

Figure 1:
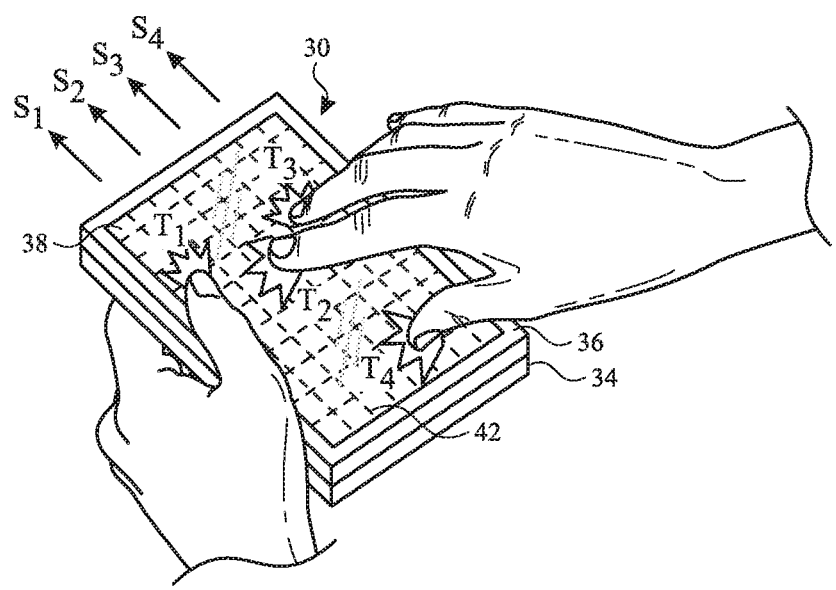
FIG. 1 is a perspective view of a touch input device, according to an embodiment of the disclosure.

In the following description of preferred embodiments, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

As referred hereinafter, the terms "touch screen," "touch sensor panel," "touch panel," "touchpad," etc. are used interchangeably to describe any touch-sensing input devices. The terms "electronic device," "host device," "touch device," and "device" are used interchangeably to describe any electronic device with touch-sensing capability. A touch device can include a touch panel as one of its input/output devices. Exemplary touch devices can include, but not limited to laptops, tablet computing devices, cellular telephones, smartphones, media players, gaming devices, handheld devices, miniature devices, wearable devices, etc. The terms "processor," "touch controller," and "touch processor" are used interchangeably to describe one or more processors in a touch device capable of processing touch data received from a touch panel. The term "touch object" can refer to any object suitable for interacting with a touch panel. Exemplary touch objects can include, but not limited to, fingers, palms, wrists, and other common body parts such as forearm (when crossing arms), side of hip (when walking), front of the body (when the device is worn with face on bottom side of wrist) that can generate touch input on a wearable device. Other examples of touch objects can include styli, or any other conductive objects. The term "grounded touch" can generally refer to touches by a well-grounded touch object. The term "ungrounded touch" can generally refer to touches by a poorly-grounded or isolated touch object. The terms "water" and "water droplets" are intended to refer to any type of liquid that can come into contact with a touch panel and generate a touch signal if grounded. The terms "false touch" and "unintended touch" are used interchangeably to refer to one or more contacts or near contacts with a touch panel that are not intended to trigger a response from the device. For example, a false touch can be one that is caused by a partially or fully grounded water droplet sitting on the surface of the touch panel. The water performance can be due to the fact that a self-capacitive touch senor typically has a very weak signal for floating water by design. Another example of a false touch can result from a touch object being close enough to (but without making contact with) the touch surface to generate a touch signal. False touches on a wearable device such as a watch can also result from light (e.g., accidental) touches by body parts such as forearm (when crossing arms), side of hip (when walking), and front of the body (when the device is worn with face on bottom side of wrist). The term "touch detection threshold" (or "threshold") can generally refer to one or more thresholds for evaluating whether a touch signal received at the touch panel is sufficient to register as a touch (or part of a touch). In the embodiments discussed below, a touch signal having one or more parameters greater than one or more touch detection thresholds can be processed as a touch (or part of a touch). A touch signal having one or more parameters less than one or more thresholds can be ignored by the touch processor or not processed as a touch. To that end, raising the touch detection threshold(s) can filter out weak touch signals that would otherwise be registered as touches under lower touch detection threshold(s).

In general, this disclosure relates to a system and method of adjusting the touch sensitivity of a touch sensor panel based on the grounding condition of the touch object. A well-grounded touch object (e.g., a user's finger) typically generates stronger touch signals on a touch sensor panel than a poorly grounded or isolated touch object. When the grounding condition of the touch object is unknown, the touch device can be programmed to recognize and process a wide range of touch signals including relatively weak signals from, for example, a poorly grounded or isolated touch object. This can involve setting the touch detection threshold low enough to register touches by poorly-grounded or isolated touch objects. However, one of the drawbacks is that the low threshold may also allow false or unintended touches to be captured and processed. In various embodiments, the touch detection threshold can be based on one or more object detection thresholds, such as those corresponding to volume, density, and ellipse radii, each of which is described in more detail below.

In various embodiments of the present disclosure, the touch device can include one or more sensors for determining (or inferring) whether it is interacting with a well-grounded touch object. That the touch object (e.g., a user) is grounded to the touch device (e.g., a wearable device) can depend on how much capacitive coupling there is from the user to the device chassis. With certain wearable devices (e.g., ones with thick plastic, minimal conductive material, and/or a touch screen distant from wrist), the user will not be as grounded as others (e.g., ones with metal chassis). Based on the determined grounding condition of the touch object, the processor of the touch device can adjust the touch detection threshold to achieve improved touch sensitivity that can reduce unintended or false touches from being processed as user input. In one embodiment, the touch device can be a wearable device that includes a sensor designed to determine whether or not the device is being worn by or in contact with a person. If the touch device is detected to be worn by or in contact with the person, the person can be presumed to be well grounded to the device and the touch device can raise the threshold(s) for registering a touch because it does not have to worry about not picking up weak touch signals from ungrounded touches. This can allow touch detection to be more selective, thus reducing unintended and/or false touches such as those caused by grounded water droplets on the touch surface. In addition, knowing whether the touch object (e.g., user) is in a grounded or ungrounded state will reduce the variability in the touch features. This in turn can allow for more accurate touch recognition.

FIG. 1 is a perspective view of a touch input device 30 of an electronic device (or host device), in accordance with one embodiment of the present disclosure. The touch input device 30 can include a display 34 and a transparent touch screen 36 positioned in front of the display 34. The display 34 can be configured to display a graphical user interface (GUI) including perhaps a pointer or cursor as well as other information to the user. In some embodiments, the display 34 can be optional. The transparent touch screen 36, on the other hand, can be an input device that is sensitive to a user's touch, allowing a user to interact with the graphical user interface on the display 34. By way of example, the touch screen 36 can allow a user to move an input pointer or make selections on the graphical user interface by simply pointing at the GUI on the display 34. In some embodiments, the touch screen 35 is not necessarily transparent.

In general, touch screen 36 can recognize a touch event on the surface 38 of the touch screen 36 and thereafter output this information to the host device. The host device can interpret the touch event and thereafter perform an action based on the touch event. The touch screen 36 shown herein can be configured to recognize one or more touch events that occur at different locations on the touch sensitive surface 38 of the touch screen 36 at the same time. That is, the touch screen 36 can allow for multiple contact points T1-T4 to be identified simultaneously. As shown, the touch screen 36 can generate separate signals S1-S4 for each touch point T1-T4 that can occur on the surface of the touch screen 36 at the same time.

The one or more touch events can be used separately or together to perform singular or multiple actions in the host device. When used separately, a first touch event may be used to perform a first action while a second touch event may be used to perform a second action that is different than the first action. The actions may for example include moving an object such as a cursor or pointer, scrolling or panning, adjusting control settings, opening a file or document, viewing a menu, making a selection, executing instructions, operating a peripheral device connected to the host device etc. When used together, first and second touch events may be used for performing one particular action. The particular action may for example include logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Recognizing one or more touch events is generally accomplished with a touch sensing arrangement. The multipoint sensing arrangement can simultaneously detect and monitor touches and the magnitude of each of those touches at distinct points across the touch sensitive surface 38 of the touch screen 36. The touch sensing arrangement can generally provide a plurality of transparent sensor coordinates or nodes 42 that work independent of one another and that represent different points on the touch screen 36. When one or more objects are pressed against the touch screen 36, one or more sensor coordinates are activated for each touch point as for example touch points T1-T4. The sensor coordinates 42 associated with each touch point T1-T4 can produce the signals S1-S4.

In one embodiment, the touch screen 36 includes a plurality of capacitance sensing nodes 42. The capacitive sensing nodes may be widely varied. For example, the capacitive sensing nodes may be based on self capacitance or mutual capacitance. In self capacitance, the "self" capacitance of a single electrode can be measured as for example relative to ground. In mutual capacitance, the mutual capacitance between at least first and second electrodes can be measured. In either case, each of the nodes 42 can work independent of the other nodes 42 so as to produce simultaneously occurring signals representative of different points on the touch screen 36. In the embodiments where the touch screen 36 is transparent, the capacitance sensing nodes 42 can be formed with a transparent conductive medium such as indium tin oxide (ITO).

In one embodiment of a self-capacitance sensing arrangement, the transparent conductive medium can be patterned into spatially separated electrodes and traces. Each of the electrodes can represent a different coordinate and the traces connect the electrodes to a capacitive sensing circuit. The coordinates may be associated with Cartesian coordinate system (x and y), Polar coordinate system (r,✓) or some other coordinate system. In a Cartesian coordinate system, the electrodes may be positioned in columns and rows so as to form a grid array with each electrode representing a different x, y coordinate. During operation, the capacitive sensing circuit can monitor changes in capacitance that occur at each of the electrodes. The positions where changes occur and the magnitude of those changes are used to help identify the one or more touch events. A change in capacitance can typically occur at an electrode when a user places an object such as a finger in close proximity to the electrode. The object can add ground increasing the sensor's capacitance to ground, thereby affecting the capacitance.

Figure 2:
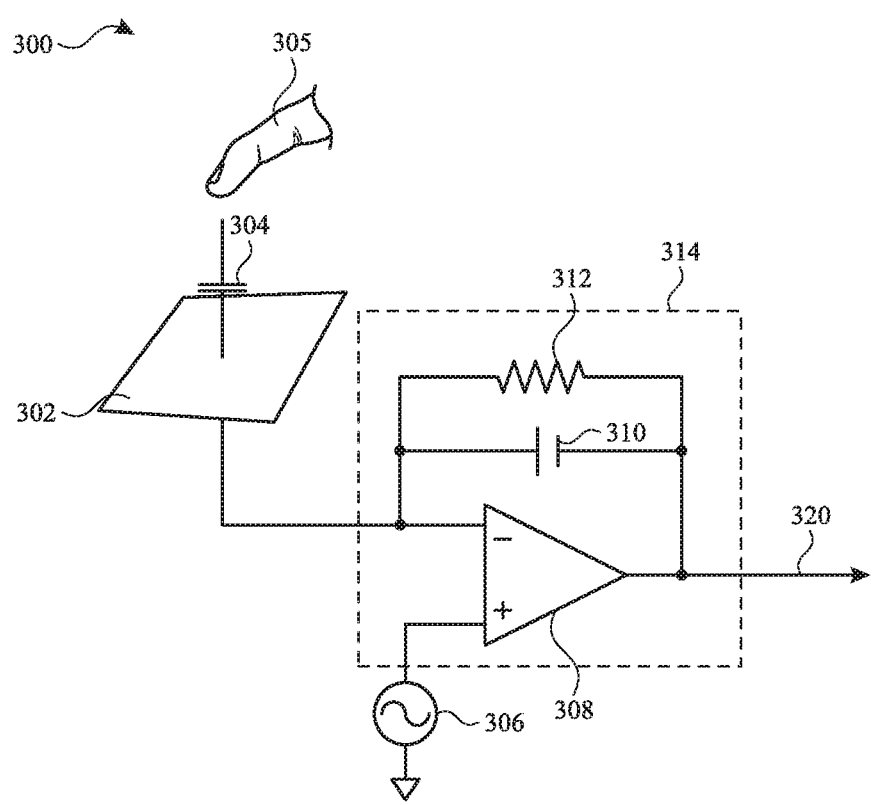
FIG. 2 illustrates an exemplary touch sensor circuit corresponding to a self-capacitance touch node electrode and sensing circuit according to examples of the disclosure.

FIG. 2 illustrates an exemplary touch sensor circuit 300 corresponding to a self-capacitance touch node electrode 302 and sensing circuit 314 according to examples of the disclosure. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. A grounded finger can increase the sensors capacitance to ground more-so than a partially grounded finger, yielding a larger signal. Touch node electrode 302 can be coupled to sensing circuit 314. Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to reduce any parasitic capacitance effect caused by a variable feedback resistor. Touch node electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a touch or proximity event. It is understood that a "touch event," as used in this disclosure, can encompass a finger or object touching the touch sensor panel (i.e., being in physical contact with the touch sensor panel), as well as the finger or object being in proximity to, but not touching, the touch sensor panel (e.g., hovering over the touch sensor panel).

Figure 3:
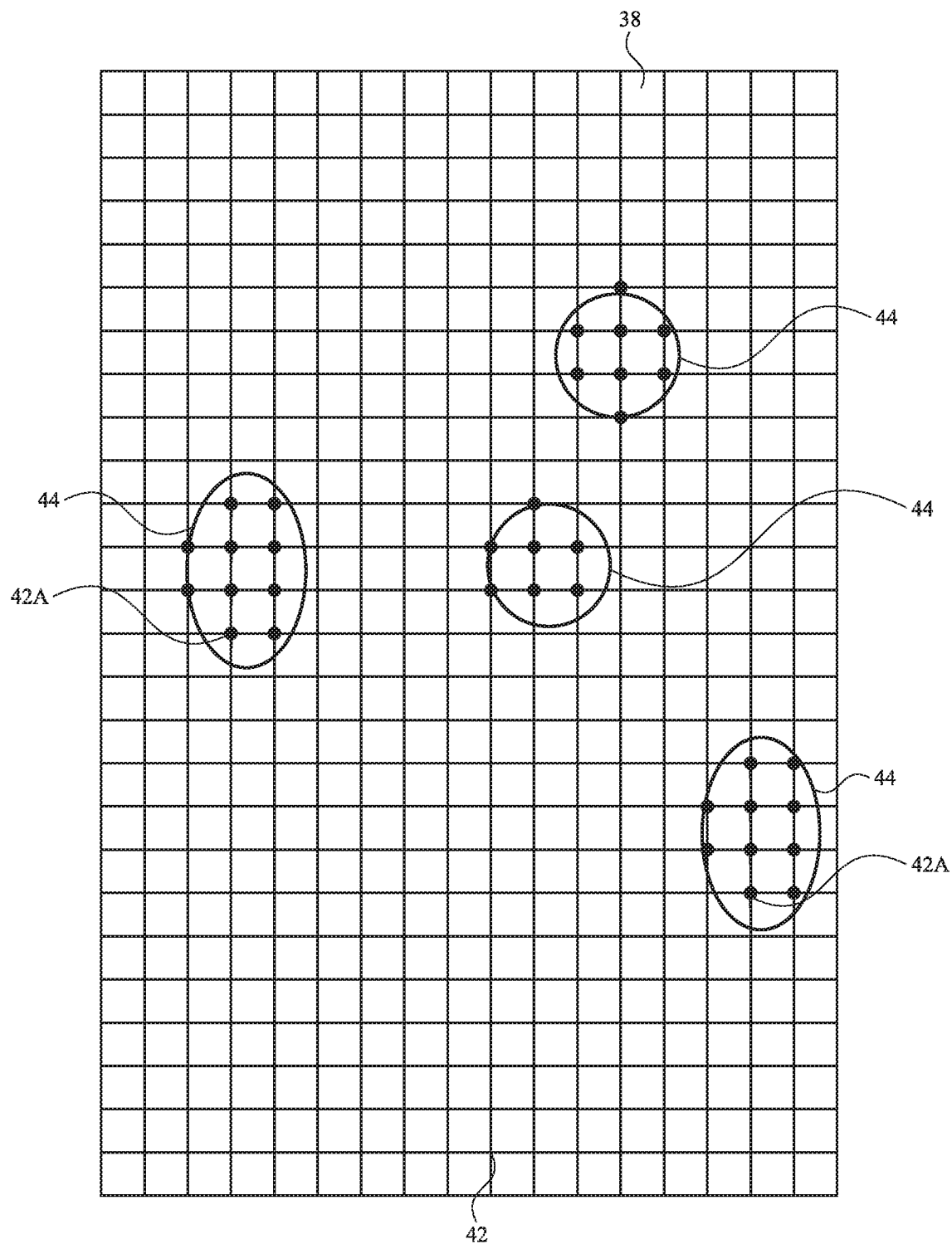
FIG. 3 illustrates a touch image captured from the touch screen at a particular point in time, according to an embodiment of the disclosure.

Referring to FIG. 3, each object in contact with a touch sensitive surface 38 of the touch screen 36 can produce a contact patch area 44. Each of the contact patch areas 44 can encompass one or more nodes 42. The nodes 42 within the contact patch area detect surface contact while the remaining nodes 42 do not detect surface contact. As a result, a pixilated image of the touch screen plane can be formed. The signals for each contact patch area 44 may be grouped together to form individual images representative of the contact patch area 44. The image of each contact patch area 44 may include high and low points based on the pressure at each point. The shape of the image as well as the high and low points within the image may be used to differentiate contact patch areas 44 that are in close proximity to one another. Furthermore, the current image, and more particularly the image of each contact patch area 44 can be compared to previous images to determine whether the touches have moved and what action to perform in a host device.

In addition to contact patch areas 44 and their encompassed nodes 42, other information associated with the touches can be obtained from the signals generated at the nodes 42 of the touch screen 36. For example, a touch volume can be calculated based on the number of touch nodes in the contact patch area (or the area of the contact patch) and the amplitudes of the touch signals generated at the nodes associated with the particular contact patch area. In other words, the touch volume can be proportional to both the contact area and the amplitudes of the touch signals from the contact area. As such, an ungrounded touch can have a smaller touch volume than a grounded touch if the contact areas of the touches are the same for both touches because the amplitudes of the touch signals of an ungrounded touch are typically lower than those of the well-grounded touch. False touches such as those caused by a touch object being in close proximity but without actually contacting the touch panel can also have small touch volumes due to their weak signals. As will be described in the embodiments below, unintended or false touches can be filtered out by raising a touch volume threshold to a predetermined level.

Additionally or alternatively, a touch density can also be obtained from signals generated at the nodes 42 of the touch screen 36. In one embodiment, touch density can be calculated based on the capacitance values at nodes within the contact patch area (e.g., a normalized sum of the peak values) and a dimension of the contact patch area (e.g., the radius of the area). Typically a grounded touch can have a higher density than an ungrounded touch because the peak values of grounded touch signals can be higher than those of ungrounded touch signals. A false touch caused by a grounded water droplet on the touch panel can have a relatively low touch density due, at least partially, to the fact that water droplets tend to spread out over the touch surface compared to a user's touch. The water droplet can be grounded when it is partially in contact with the metal bezel of the device. A touch density threshold can be set by the touch processor in the device such that when the touch density associated with a touch signal is below the density threshold, the signal will be ignored in touch processing (or not processed as a touch). As will be discussed in detail below, the density threshold can also be raised to prevent less dense contacts such as grounded water droplets on the touch surface from being registered as touches.

Additionally or alternatively, ellipse radii associated with one or more contact patch areas can also be obtained from signals generated at the nodes 42 of the touch screen 36. The ellipse radii can be used in distinguishing large objects such as palms or device being submerged in water as distinct from fingers. Accordingly, an ellipse radius threshold can be set by the touch processor such that when the detected ellipse radius indicates a touch by a large object, the touch signal can be ignored in touch processing (or not processed as a touch).

In some embodiments, the touch processor of the device can be based on a combination of touch detection thresholds such as the touch volume threshold and touch density threshold discussed above to fine tune the range of touch signals selected for further processing. When the touch processor is able to determine the grounding condition of the touch object (i.e., whether or not the touch object is likely grounded), it can manipulate one or more of these thresholds to make touch detection more stringent and thereby preventing unintended and/or false contacts such as water droplets on the touch surface from being registered as a touch.

Figure 4:
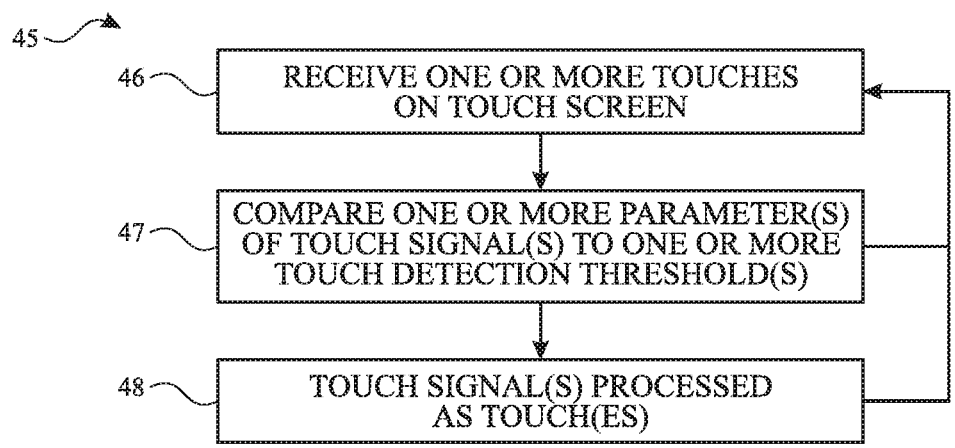
FIG. 4 is a flow chart illustrating the exemplary steps of a touch processing method, according to an embodiment of the disclosure.

FIG. 4 illustrates the exemplary steps in a method 45 of detecting one or more touches on the device of FIG. 1, in accordance with an embodiment of the present disclosure. The method can begin at block 46 where one or more touches are received on the surface of the touch screen and recognized by the capacitive touch sensors and sensing circuitry discussed above. The touches can be by objects (e.g., fingers) placed on the surface of the touch screen. Following block 46, the process flow can proceed to block 47 where a processor (e.g., a touch controller) can compare one or more parameters of the touch signals (e.g., touch volume, touch density, ellipse radius) to one or more touch detection thresholds. If a touch signal has one or more touch parameters that exceed one or more of the thresholds, the touch signal is processed as a touch in block 48. However, if one or more parameters of a touch signal are less than one or more touch detection thresholds, it is not processed as a touch.

Without the capability of knowing whether the touch object is grounded or not, the touch controller can be programmed to capture both grounded and ungrounded touches on the touch panel. Because touches by a poorly-grounded (or isolated) object can be weak, this would require the touch controller hold one or more touch detection thresholds such as the touch volume threshold and/or touch density threshold at a relatively low level to capture the ungrounded touches. One of the drawbacks for using low thresholds is that the touch controller may also register false touches that also generate weak touch signals that may be indistinguishable from the signal of an ungrounded touch. As a result, the touch panel can be overly sensitive, potentially triggering the host device to perform unintended operations in response to the false touches.

In one embodiment of the present disclosure, the touch controller can raise one or more of the touch detection thresholds to prevent false touches from being registered when it determines (or infers) that the touch object is well grounded. When the touch object is well grounded, the touch signal generated by the touch can be relatively strong and would still register as a touch even if the thresholds (e.g., the touch volume and/or touch density thresholds) are raised. Because the touch controller has determined (or inferred) that the touch object is well grounded, it does not have to be concerned about missing ungrounded touches.

Figure 5:
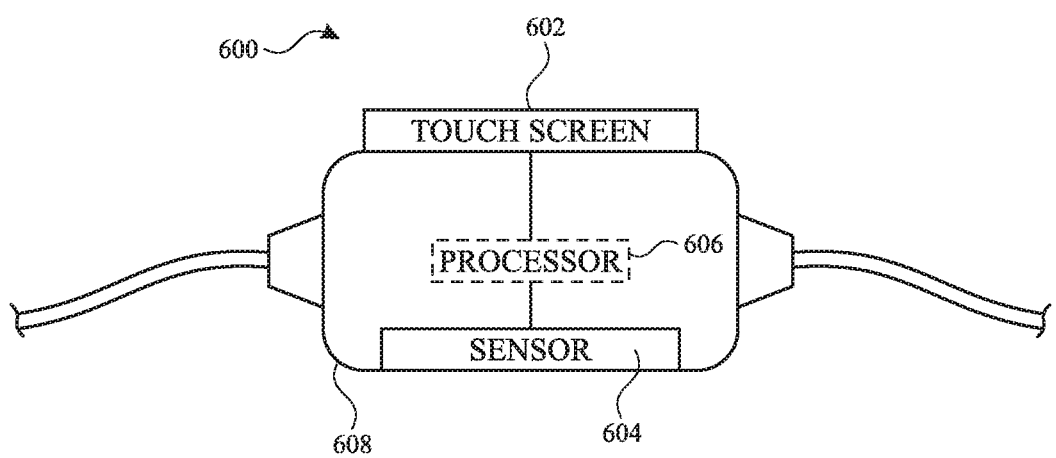
FIG. 5 illustrates the exemplary components of a wearable device, according to an embodiment of the disclosure.

The host device can determine (or infer) the grounding condition of the touch object by any suitable means. For example, in one embodiment, the host device can be a wearable device 600 such as the one illustrated in FIG. 5. The wearable device 600 can include a touch screen 602 on its front surface (i.e., the top surface as shown in FIG. 5) for receiving touch input from a user. The wearable device 600 can include a metal chassis 608 that can be extended to form part of the back surface. When the user is in contact with the metal chassis 608 of the wearable device 600, the capacitance of the user's body to ground can be large enough for the user to be well grounded. In some embodiments, the chassis 608 does not need to be fully metal. For example, a plastic chassis that has an inner conductive coating can be sufficiently grounded to the user to achieve the same result. The wearable device 600 can also include a sensor 604 on the back surface (i.e., bottom surface as shown in FIG. 5). The sensor 604 can provide signals indicative of a grounding condition of the device 600. For example, the sensor 604 can be any type of sensor that can provide signals indicative of whether the wearable device 600 is being worn by or otherwise in contact with a person, including, but not limited to, a proximity sensor, physiological sensor (e.g., photoplethysmography (PPG) sensor, heartbeat or heart rate sensor, galvanic skin response sensor, blood pressure sensor, ECG sensor), optical sensor, accelerometer, gyroscope, ambient light sensor, color sensor (similar to optical but using multiple LED wavelengths), or touch sensor. This can signal that the device is being worn by or otherwise in contact with a user and, by inference, the user is well grounded. For example, a heartbeat or heart rate sensor can detect the presence or absence of a heartbeat or heart rate. If the sensor detects the presence of a heartbeat or heart rate, then the device 600 can infer that the device is being worn. Another example is an optical proximity sensor configured to sense that the device is in proximity to or in contact with the user. The optical proximity sensor can be positioned to emit light, and, based on the reflection, determine or infer whether the device is being worn by or in contact with a user. A further example can be a galvanic skin response sensor that senses electrodermal activity indicative of the device being worn by or in contact with a user.

Although FIG. 5 only illustrates one sensor on the back of the device, it should be understood that the sensor 604 can include any number of sensors of the same or different types. It should be understood that other types of sensors can also be used and the sensor(s) can be placed at different locations on the device depending on the type of the wearable device and how the device is intended to be worn by a user. It should also be understood that the device does not have to be a wearable device so long as there can be relatively accurate way of determining (or inferring) whether its user is well grounded or not. In the embodiment, the sensor 604 can be connected to a processor 606 of the wearable device 600. The processor 606 can determine (or infer) based on the signals received from the sensor 604 whether the device is being worn by or otherwise in contact with a user. If the device is determined (or inferred) to be worn by or otherwise in contact with the user, the user can be presumed to be well grounded to the metal chassis 608 of the device 600. This can allow the processor to adjust (e.g., raise) one or more touch detection thresholds such as the touch volume threshold and the touch density threshold discussed above to a level at which only touches with touch density and/or volume above the thresholds can register.

In some embodiments, the high touch volume/density thresholds can be set as the default threshold levels if the wearable device 600 is designed to be only operated when worn by its user (i.e., in the absence of a sensor providing grounding information). In other embodiments, the one or more thresholds can be dynamically adjusted depending on the signals received from the sensor 604. In these embodiments, the default thresholds can be set low and the processor 606 can be programmed to dynamically adjust the thresholds in response to signals received from, for example, the sensor 604.

Figure 6:
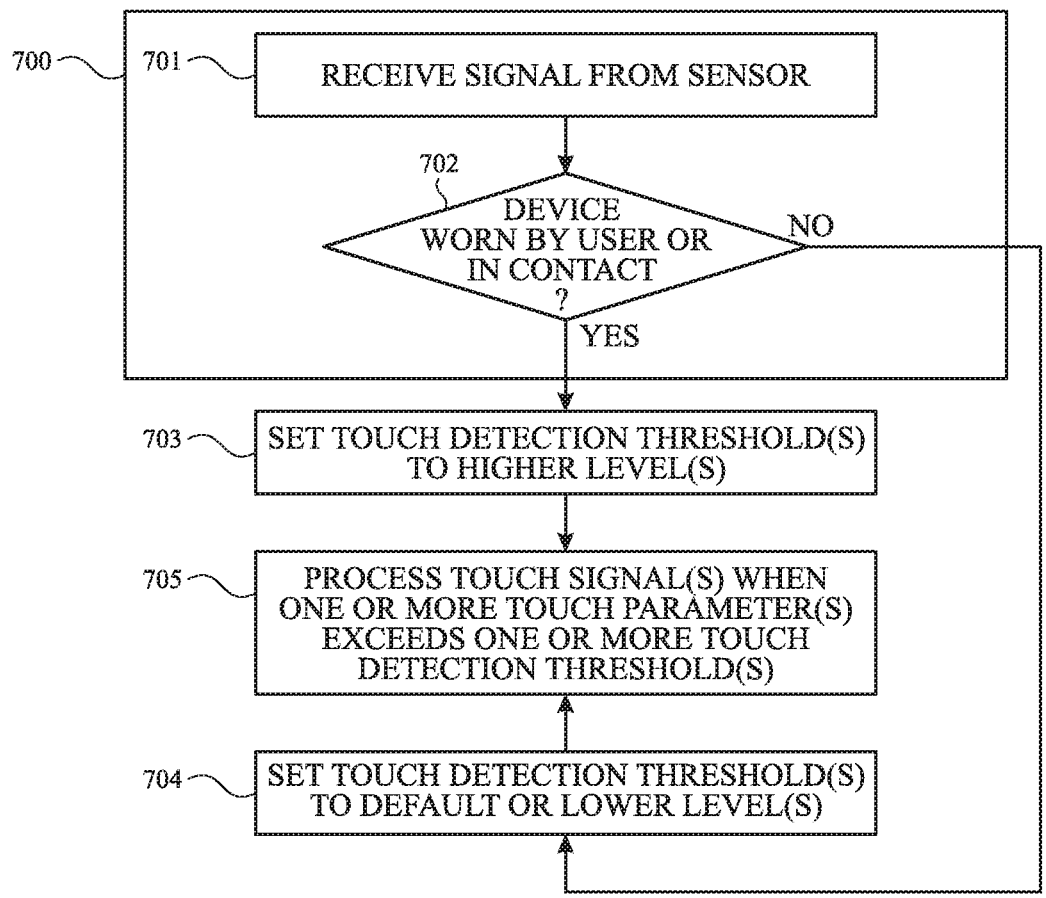
FIG. 6 is a flow chart illustrating the exemplary steps in touch processing, according to an embodiment of the disclosure.

FIG. 6 illustrates the exemplary steps in a method of dynamically adjusting touch detection thresholds by a touch processor. First, the processor in the wearable device 600 can determine (or infer) the grounding condition of the device (step 700). To determine (or infer) the grounding condition of the device, the processor can receive signals from the sensor 604 (step 701) that are indicative of the grounding condition. For example, based on signals from sensor 604, the processor can determine (or infer) whether the device is being worn by or in contact with the user (step 702). When the processor determines (or infers) that the device being is worn by or otherwise in contact with the user (e.g., on the user's wrist), the processor can infer that the device 600 is adequately grounded to the person and raise one or more touch detection thresholds (e.g., the touch volume threshold, touch density threshold, or ellipse radius threshold) to a higher level to exclude any weak touch signals (e.g., signals from false touches) from being processed (step 703). In one embodiment, such weak signals can simply be ignored by the processor. As used herein, determining a grounding condition or determining that a device 600 is being worn or otherwise in contact with a person can include inferring the same based on data from the sensor 604. That is, the determination or inference is based on a confidence determination of the grounding condition or whether device 600 is being worn by or otherwise in contact with a person.

If the processor determines that the device is not being worn by or otherwise in contact with the user based on the signals received from the sensor 604, the processor can maintain the touch detection thresholds at the default level to have a wider tolerance for touch signals than if the thresholds were raised (step 704). The low default thresholds can allow the processor 606 to register both grounded and ungrounded touches on the touch screen 602. In one embodiment, the default touch volume threshold used when the processor does not determine that the device is being worn by or otherwise in contact with the user can be set at about 50% of the raised (i.e., high) touch volume threshold used when the device is worn by the user. Similarly, the default (i.e., low) touch density threshold can be set at 50% of the raised (i.e., high) touch volume threshold. After adjusting or maintaining the one or more thresholds, the processor can compare one or more parameters of the touch signals (e.g., touch volume, touch density, ellipse radius) to one or more touch detection thresholds set in steps 703 or 704, and process the touch signals having one or more touch parameters that exceed one or more of the thresholds (step 705).

Figure 7:
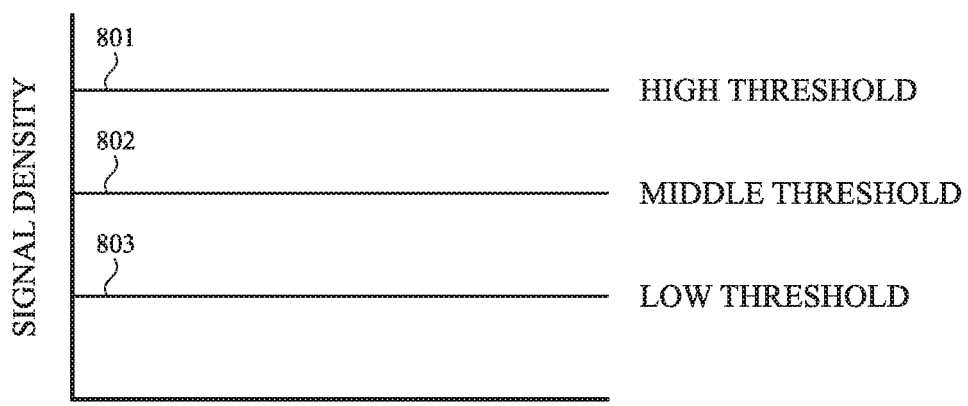
FIG. 7 illustrates the exemplary touch detection threshold levels that can be used by a touch processor to adjust the sensitivity of a touch panel, according to an embodiment of the disclosure.

Although the above described embodiments discloses using two different threshold levels, it should be understood that the thresholds can be set at additional levels to fine tune the sensitivity of the touch panel. FIG. 7 illustrates three different touch density thresholds 801, 802, 803. If the touch processor sets the touch density thresholds to the highest level 801, only signals from a well-grounded object can be registered as a touch. Both partially grounded touches and partially grounded water droplet touches can be filtered. If the touch processor sets the touch density thresholds to the middle level 802, it would allow both partially grounded touches and partially grounded water droplets to register. If the touch processor sets the touch density threshold to the lowest level 803, ungrounded touches can also be captured. Similarly, other touch detection thresholds (e.g., touch volume level) can also have more than two settings.

Figure 8:
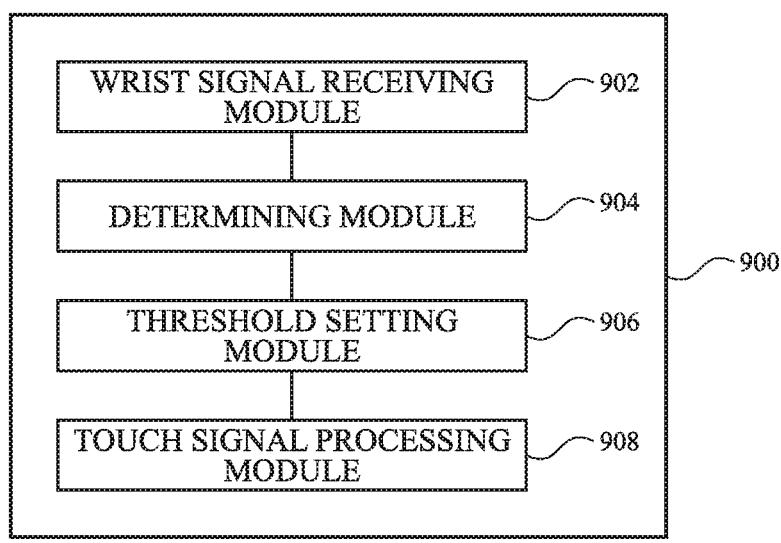
FIG. 8 illustrates the exemplary modules of a processor, according to an embodiment of the disclosure.

FIG. 8 illustrates the exemplary modules of a touch controller or processor, according to an embodiment of the disclosure. The touch controller and/or processor 900 can include one or more of the following modules, each operably coupled to at least one other module: a sensor signal receiving module 902 configured to receive signals from the sensor 604; a determining module 904 configured to determine whether the device is worn by or otherwise in contact with the user; a threshold setting module 906 configured to set one or more touch detection thresholds to either their respective default levels or raised levels based on the output of the determining module 904; and a touch signal processing module 908 configured to process touch signals exceeding the set thresholds.

Note that one or more of the modules described above can be implemented in software or firmware stored in memory and executed by a processor of the host device. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 9:
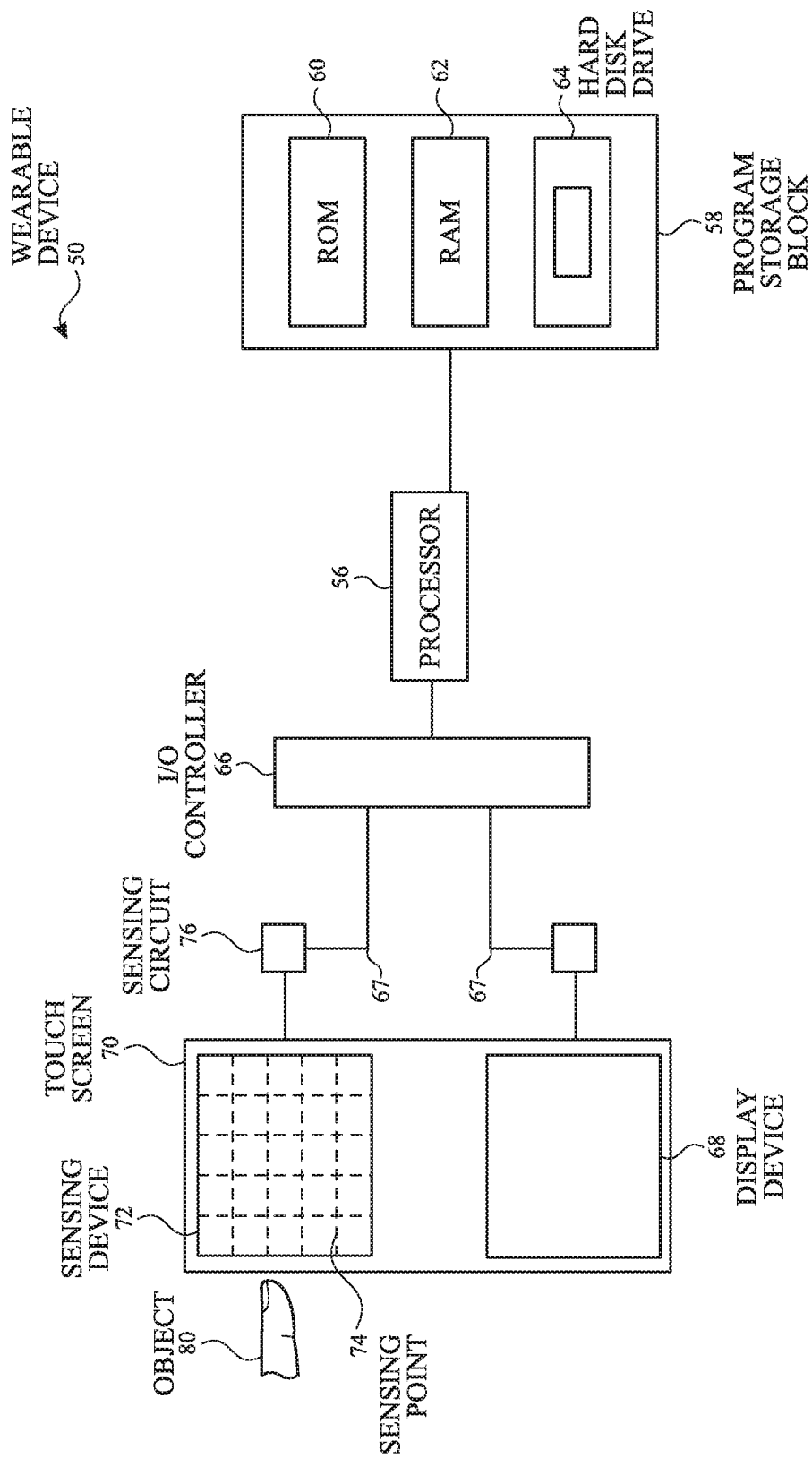
FIG. 9 is a block diagram illustrating the exemplary components of a wearable device 50, in accordance with one embodiment of the present disclosure.

FIG. 9 is a block diagram illustrating the exemplary components of a wearable device 50, in accordance with one embodiment of the present disclosure. As shown, the wearable device 50 can include a processor 56 configured to execute instructions and to carry out operations associated with the wearable device 50. For example, using instructions retrieved from, for example, memory, the processor 56 may control the reception and manipulation of input and output data between components of the wearable device 50. The processor 56 can be a single-chip processor or can be implemented with multiple components.

In most cases, the processor 56 together with an operating system can operate to execute computer code and produce and use data. The computer code and data may reside within a program storage block 58 that is operatively coupled to the processor 56. Program storage block 58 can generally provide a place to hold data that is being used by the wearable device 50. By way of example, the program storage block may include Read-Only Memory (ROM) 60, Random-Access Memory (RAM) 62, hard disk drive 64 and/or the like. The computer code and data could also reside on a removable storage medium and loaded or installed onto the computer system when needed. Removable storage mediums can include, for example, CD-ROM, PC-CARD, floppy disk, magnetic tape, and a network component.

The wearable device 50 can also include an input/output (I/O) controller 66 that is operatively coupled to the processor 56. The (I/O) controller 66 may be integrated with the processor 56 or it may be a separate component as shown. The I/O controller 66 can be configured to control interactions with one or more I/O devices. The I/O controller 66 can operate by exchanging data between the processor and the I/O devices that desire to communicate with the processor. The I/O devices and the I/O controller can communicate through a data link 67. The data link 67 may be a one way link or two way link. In some cases, the I/O devices may be connected to the I/O controller 66 through wired connections. In other cases, the I/O devices may be connected to the I/O controller 66 through wireless connections. By way of example, the data link 67 may correspond to PS/2, USB, Firewire, IR, RF, Bluetooth or the like.

The wearable device 50 can also include a display device 68 that is operatively coupled to the processor 56. The display device 68 may be a separate component (peripheral device) or it may be integrated with the processor and program storage in a single device. The display device 68 is configured to display a graphical user interface (GUI) including perhaps a pointer or cursor as well as other information to the user.

The wearable device 50 can also include a touch screen 70 that is operatively coupled to the processor 56. The touch screen 70 can be a transparent panel that is positioned in front of the display device 68. The touch screen 70 may be integrated with the display device 68 or it may be a separate component. The touch screen 70 can be configured to receive input from a user's touch and to send this information to the processor 56. In most cases, the touch screen 70 can recognize touches and the position and/or magnitude of touches on its surface. The touch screen 70 can report the touches to the processor 56 and the processor 56 can interpret the touches in accordance with its programming. For example, the processor 56 may initiate a task in accordance with a particular touch.

In accordance with one embodiment, the touch screen 70 can track one or more multiple objects, which rest on, tap on, or move across the touch sensitive surface of the touch screen. The objects can be any conductive objects including, but not limited to fingers, palms, and styli. To elaborate, the touch screen 70 can include a sensing device 72 configured to detect an object in close proximity thereto and/or the pressure exerted thereon. The sensing device 72 may be widely varied. In one particular embodiment, the sensing device 72 can be divided into several independent and spatially distinct sensing points, nodes or regions 74 that are positioned throughout the touch screen 70. The sensing points 74, which can be hidden from view, are dispersed about the touch screen 70 with each sensing point 74 representing a different position on the surface of the touch screen 70 (or touch screen plane). The sensing points 74 may be positioned in a grid or a node array where each sensing point 74 is capable of generating a signal at the same time. In the simplest case, a signal can be produced each time an object is positioned over a sensing point 74. When an object is placed over multiple sensing points 74 or when the object is moved between or over multiple sensing point 74, multiple signals can be generated.

The number and configuration of the sensing points 74 may be widely varied. The number of sensing points 74 generally depends on the desired sensitivity as well as the desired transparency of the touch screen 70. More nodes or sensing points can generally increase sensitivity, but reduce transparency (and vice versa). With regards to configuration, the sensing points 74 can map the touch screen plane into a coordinate system such as a Cartesian coordinate system, a Polar coordinate system, or some other coordinate system. When a Cartesian coordinate system is used (as shown), the sensing points 74 can correspond to x and y coordinates.

When a Polar coordinate system is used, the sensing points can correspond to radial (r) and angular coordinates (✓).

The touch screen 70 can include a sensing circuit 76 that acquires the data from the sensing device 72 and that supply the acquired data to the processor 56. Alternatively, the processor may include this functionality. In one embodiment, the sensing circuit 76 can be configured to send raw data to the processor 56 so that the processor 56 can process the raw data. For example, the processor 56 can receive data from the sensing circuit 76 and then determine how the data is to be used within the host device 50. The data may include the coordinates of each sensing point 74 as well as the pressure exerted on each sensing point 74. In another embodiment, the sensing circuit 76 can be configured to process the raw data itself. That is, the sensing circuit 76 can read the pulses from the sensing points 74 and turns them into data that the processor 56 can understand. The sensing circuit 76 may perform filtering and/or conversion processes. Filtering processes are typically implemented to reduce a busy data stream so that the processor 56 is not overloaded with redundant or non-essential data. In some embodiments, the processor 56 can perform at least some of the data filtering. The conversion processes may be implemented to adjust the raw data before sending or reporting them to the processor 56. The conversions may include determining the center point for each touch region (e.g., centroid). As discussed above, in some embodiments of the present disclosure, the processor 56 can also fine tune the algorithms concerning touch detection such that only touch signals that meets certain thresholds (e.g., touch density threshold and touch volume threshold) is processed as a touch input. Touch signals that do not meet the threshold can be ignored to prevent false touches caused by, for example, water droplets on the touch surface or an object hovering above the touch panel, from being registered as a touch input.

Referring back to FIG. 9, the sensing circuit 76 may include a storage element for storing a touch screen program, which is a capable of controlling different aspects of the touch screen 70. For example, the touch screen program may contain what type of value to output based on the sensing points 74 selected (e.g., coordinates). In fact, the sensing circuit in conjunction with the touch screen program may follow a predetermined communication protocol. As is generally well known, communication protocols are a set of rules and procedures for exchanging data between two devices. Communication protocols be used for transmitting information in data blocks or packets that contain the data to be transmitted, the data required to direct the packet to its destination, and the data that corrects errors that occur along the way. By way of example, the sensing circuit may place the data in a HID format (Human Interface Device).

The sensing circuit 76 can include one or more microcontrollers, each of which monitors one or more sensing points 74. The microcontrollers may, for example, correspond to an application specific integrated circuit (ASIC), which can work with firmware to monitor the signals from the sensing device 72 and to process the monitored signals and to report this information to the processor 56.

In accordance with one embodiment, the sensing device 72 can be based on capacitance. As should be appreciated, whenever two electrically conductive members come close to one another without actually touching, their electric fields can interact to form capacitance. In most cases, the first electrically conductive member can be a sensing point 74 and the second electrically conductive member can be an object 80 such as a finger or a grounded water drop. As the object 80 approaches the surface of the touch screen 70, a tiny capacitance can form between the object 80 and the sensing points 74 in close proximity to the object 80. By detecting changes in capacitance at each of the sensing points 74 and noting the position of the sensing points, the sensing circuit can recognize one or more objects, and determine the location, pressure, direction, speed and/or acceleration of the objects 80 as they are moved across the touch screen 70. For example, the sensing circuit can determine when and where each of the fingers and palm of one or more hands (and water drop) are touching as well as the pressure being exerted by the finger and palm of the hand(s) (and water drop) at the same time.

The simplicity of capacitance can allow for a great deal of flexibility in design and construction of the sensing device 72. By way of example, the sensing device 72 may be based on self capacitance or mutual capacitance. In self capacitance, each of the sensing points 74 can be provided by an individual charged electrode or a grid of electrodes. As an object approaches the surface of the touch screen 70, the object capacitive can couple to those electrodes in close proximity to the object thereby adding ground increasing the sensors capacitance to ground. The amount of charge in each of the electrodes can be measured by the sensing circuit 76 to determine the positions of one or more objects when they touch the touch screen 70.

Therefore, according to the above, some examples of the disclosure are directed to a device. The device can comprise a first sensor configured to provide signals indicative of a grounding condition of the device, a touch sensor configured to provide a touch signal indicative of a touch by a touch object, and a processor operably coupled to both the first sensor and the touch sensor and configured to set one or more touch detection thresholds based on the grounding condition, and determine whether one or more parameters of the touch signal exceeds the one or more touch detection thresholds. Additionally or alternatively to one or more of the examples disclosed above, the processor can be further configured to register a touch corresponding to the touch signal when the one or more parameters of the touch signal exceeds the one or more touch detection thresholds and not register a touch when the one or more parameters of the touch signal does not exceed the one or more touch detection thresholds. Additionally or alternatively to one or more of the examples disclosed above, the device can be a wearable device and the processor can be configured to determine whether the wearable device is being worn by a person based on the signals from the first sensor. Additionally or alternatively to one or more of the examples disclosed above, the first sensor can comprise at least one of a proximity sensor, photoplethysmography sensor, optical sensor, accelerometer, gyroscope, ambient light sensor, color sensor, galvanic skin response sensor, blood pressure sensor, and capacitive sensor. Additionally or alternatively to one or more of the examples disclosed above, the first sensor and the touch sensor can be on opposite surfaces of the wearable device. Additionally or alternatively to one or more of the examples disclosed above, the one or more touch detection thresholds can be set higher when the device is determined to be worn by the person than when the device is determined not to be worn by the person. Additionally or alternatively to one or more of the examples disclosed above, the one or more touch detection thresholds can comprise at least one of a touch volume threshold, a touch density threshold, and an ellipse radius threshold. Additionally or alternatively to one or more of the examples disclosed above, the processor can be configured to determine whether one or more parameters of the touch signal exceeds the one or more touch detection thresholds by calculating a touch volume based on the touch signal and comparing the calculated touch volume to the touch volume threshold. Additionally or alternatively to one or more of the examples disclosed above, the touch volume can be calculated based on a touch area and amplitudes of touch signals within the touch area. Additionally or alternatively to one or more of the examples disclosed above, the processor can be configured to determine whether one or more parameters of the touch signal exceeds the one or more touch detection thresholds by calculating a touch density from the touch signal and compare the calculated touch density to the touch density threshold. Additionally or alternatively to one or more of the examples disclosed above, the touch density can be calculated based on a dimension of the touch area and peak capacitance values from on the touch area. The dimension of the touch area and peak capacitance values can be derivable from the touch signal.

Some examples of the disclosure are directed to a computer-implemented method. The method can comprise receiving a first signal from a first sensor of a device, the first signal indicative of a grounding condition of the device, setting one or more touch detection thresholds based on the grounding condition, receiving a touch signal from a touch sensor of the device, the touch signal indicative of a touch by an object, and determining whether one or more parameters of the touch signal exceeds the one or more touch detection thresholds. Additionally or alternatively to one or more of the examples disclosed above, the method can further comprise registering a touch corresponding to the touch signal when the one or more parameters of the touch signal exceeds the one or more touch detection thresholds, and not registering a touch when the one or more parameters of the touch signal does not exceed the one or more touch detection thresholds. Additionally or alternatively to one or more of the examples disclosed above, the one or more touch detection thresholds can comprise at least one of a touch volume threshold, a touch density threshold, and an ellipse radius threshold. Additionally or alternatively to one or more of the examples disclosed above, the method can further comprise determining whether one or more parameters of the touch signal exceeds the one or more touch detection threshold by calculating a touch volume based on the touch signal and comparing the calculated touch volume to the touch volume threshold. Additionally or alternatively to one or more of the examples disclosed above, the touch volume can be calculated based on a touch area and amplitudes of the touch signals within the touch area. Additionally or alternatively to one or more of the examples disclosed above, the method an further comprise determining whether one or more parameters of the touch signal exceeds the one or more touch thresholds by calculating a touch density from the touch signal and comparing the calculated touch density to the touch density threshold. Additionally or alternatively to one or more of the examples disclosed above, wherein the touch density can be calculated based on a dimension of the touch area and peak capacitance values from the touch area, wherein the dimensions of the touch area and peak capacitance values are derivable from the touch signal. Additionally or alternatively to one or more of the examples disclosed above, the method can further comprise setting the one or more touch detection thresholds higher when the device is determined to be worn by a person than when the device is determined not to be worn by the person.

Some examples of the disclosure are directed to a non-transitory computer readable storage medium. The computer readable medium can contain instructions that, when executed by a device including a processor, can perform a method. The method can comprise receiving a first signal from a first sensor of a device, the first signal indicative of a grounding condition of the device, setting one or more touch detection thresholds based on the grounding condition, receiving a touch signal from a touch sensor of the device, the touch signal indicative of a touch by an object, and determining whether one or more parameters of the touch signal exceeds the one or more touch detection thresholds. Additionally or alternatively to one or more of the examples disclosed above, the method can further comprise registering a touch corresponding to the touch signal when the one or more parameters of the touch signal exceeds the one or more touch detection thresholds, and not registering a touch when the one or more parameters of the touch signal does not exceed the one or more touch detection thresholds. Additionally or alternatively to one or more of the examples disclosed above, the one or more touch detection thresholds can comprise at least one of a touch volume threshold, a touch density threshold, and an ellipse radius threshold. Additionally or alternatively to one or more of the examples disclosed above, the method can further comprise determining whether one or more parameters of the touch signal exceeds the one or more touch detection threshold by calculating a touch volume based on the touch signal and comparing the calculated touch volume to the touch volume threshold. Additionally or alternatively to one or more of the examples disclosed above, the touch volume can be calculated based on a touch area and amplitudes of the touch signals within the touch area. Additionally or alternatively to one or more of the examples disclosed above, the method an further comprise determining whether one or more parameters of the touch signal exceeds the one or more touch thresholds by calculating a touch density from the touch signal and comparing the calculated touch density to the touch density threshold. Additionally or alternatively to one or more of the examples disclosed above, wherein the touch density can be calculated based on a dimension of the touch area and peak capacitance values from the touch area, wherein the dimensions of the touch area and peak capacitance values are derivable from the touch signal. Additionally or alternatively to one or more of the examples disclosed above, the method can further comprise setting the one or more touch detection thresholds higher when the device is determined to be worn by a person than when the device is determined not to be worn by the person.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A wearable device comprising:
   a touchscreen configured to provide a touch signal indicative of a first contact on the touchscreen;
   a sensor configured to provide a signal indicative of a second contact on a portion of the wearable device different from the touchscreen; and
   a processor operably coupled to both the touchscreen and the sensor and configured to:
      detect the touch signal indicative of the first contact on the touchscreen;
      determine whether the wearable device is worn based on the signal indicative of the second contact;

in accordance with a determination that there is the second contact on the portion of the wearable device different from the touchscreen, determine whether one or more parameters of the touch signal exceed one or more first touch detection thresholds; and in accordance with a determination that there is no second contact on the portion of the wearable device different from the touchscreen, determine whether the one or more parameters of the touch signal exceed one or more second touch detection thresholds, wherein the one or more second touch detection thresholds is different from the one or more first touch detection thresholds.

2. The wearable device of claim 1, wherein the processor is further configured to:

in accordance with the determination that there is the second contact on the portion of the wearable device different from the touchscreen:

in accordance with a determination that the one or more parameters of the touch signal exceeds the one or more first touch detection thresholds, register a touch corresponding to the touch signal; and in accordance with a determination that the one or more parameters of the touch signal fail to exceed the one or more first touch detection thresholds, forgo registering a touch corresponding to the touch signal; and in accordance with the determination that there is no second contact on the portion of the wearable device different from the touchscreen:

in accordance with a determination that the one or more parameters of the touch signal exceeds the one or more second touch detection thresholds, register a touch corresponding to the touch signal; and in accordance with a determination that the one or more parameters of the touch signal fail to exceed the one or more second touch detection thresholds, forgo registering a touch corresponding to the touch signal.

3. The wearable device of claim 1, wherein the sensor comprises a proximity sensor, a physiological sensor, an optical sensor, or a capacitive sensor.

4. The wearable device of claim 1, wherein the sensor and the touchscreen are on opposite surfaces of the wearable device.

5. The wearable device of claim 1, wherein the one or more first touch detection thresholds are greater than the one or second touch detection thresholds.

6. The wearable device of claim 1, wherein the one or more first touch detection thresholds comprise a first touch density threshold and the one or more second touch detection thresholds comprise a second touch density threshold, wherein the processor is further configured to:

calculate a touch density from the touch signal;

in accordance with the determination that there is the second contact on the portion of the wearable device different from the touchscreen, determine whether the one or more parameters of the touch signal exceeds the one or more first touch detection thresholds by comparing the calculated touch density to the first touch density threshold; and in accordance with the determination that there is no second contact on the portion of the wearable device different from the touchscreen, determine whether the one or more parameters of the touch signal exceeds the one or more second touch detection thresholds by comparing the calculated second touch density to the second touch density threshold.

7. The wearable device of claim 6, wherein the touch density is calculated based on a dimension of a touch area and peak capacitance values from the touch area.

8. A method comprising:

at a wearable device comprising a touchscreen configured to provide a touch signal indicative of a first contact on the touchscreen, a sensor configured to provide a signal indicative of a second contact on a portion of the wearable device different from the touchscreen, and a processor operably coupled to both the touchscreen and the sensor:

detecting the touch signal indicative of the first contact on the touchscreen;

determining whether the wearable device is worn based on the signal indicative of the second contact;

in accordance with a determination that there is the second contact on the portion of the wearable device different from the touchscreen, determining whether one or more parameters of the touch signal exceed one or more first touch detection thresholds; and in accordance with a determination that there is no second contact on the portion of the wearable device different from the touchscreen, determining whether the one or more parameters of the touch signal exceed one or more second touch detection thresholds, wherein the one or more second touch detection thresholds is different from the one or more first touch detection thresholds.

9. The method of claim 8, further comprising:

in accordance with the determination that there is the second contact on the portion of the wearable device different from the touchscreen:

in accordance with a determination that the one or more parameters of the touch signal exceeds the one or more first touch detection thresholds, registering a touch corresponding to the touch signal; and in accordance with a determination that the one or more parameters of the touch signal fail to exceed the one or more first touch detection thresholds, forgoing registering a touch corresponding to the touch signal; and in accordance with the determination that there is no second contact on the portion of the wearable device different from the touchscreen:

in accordance with a determination that the one or more parameters of the touch signal exceeds the one or more second touch detection thresholds, registering a touch corresponding to the touch signal; and in accordance with a determination that the one or more parameters of the touch signal fail to exceed the one or more second touch detection thresholds, forgoing registering a touch corresponding to the touch signal.

10. The method of claim 8, wherein the one or more first touch detection thresholds are greater than the one or second touch detection thresholds.

11. The method of claim 8, wherein the one or more first touch detection thresholds comprise a first touch density threshold and the one or more second touch detection thresholds comprise a second touch density threshold, wherein the method further comprises:

calculating a touch density from the touch signal;

in accordance with the determination that there is the second contact on the portion of the wearable device different from the touchscreen, determining whether the one or more parameters of the touch signal exceeds the one or more first touch detection thresholds by comparing the calculated touch density to the first touch density threshold; and in accordance with the determination that there is no second contact on the portion of the wearable device different from the touchscreen, determining whether the one or more parameters of the touch signal exceeds the one or more second touch detection thresholds by comparing the calculated second touch density to the second touch density threshold.

12. The method of claim 11, wherein the touch density is calculated based on a dimension of a touch area and peak capacitance values from the touch area.

13. A non-transitory computer readable storage medium storing instructions that, when executed by a wearable device including a touchscreen configured to provide a touch signal indicative of a first contact on the touchscreen, a sensor configured to provide a signal indicative of a second contact on a portion of the wearable device different from the touchscreen, and a processor operably coupled to both the touchscreen and the sensor, cause the processor to:
  detect the touch signal indicative of the first contact on the touchscreen;
  determining whether the wearable device is worn based on the signal indicative of the second contact;
  in accordance with a determination that there is the second contact on the portion of the wearable device different from the touchscreen, determine whether one or more parameters of the touch signal exceed one or more first touch detection thresholds; and
  in accordance with a determination that there is no second contact on the portion of the wearable device different from the touchscreen, determine whether the one or more parameters of the touch signal exceed one or more second touch detection thresholds, wherein the one or more second touch detection thresholds is different from the one or more first touch detection thresholds.

14. The non-transitory computer readable storage medium of claim 13, the instructions, when executed by the wearable device, further cause the processor to:
  in accordance with the determination that there is the second contact on the portion of the wearable device different from the touchscreen:
    in accordance with a determination that the one or more parameters of the touch signal exceeds the one or more first touch detection thresholds, register a touch corresponding to the touch signal; and
    in accordance with a determination that the one or more parameters of the touch signal fail to exceed the one or more first touch detection thresholds, forgo registering a touch corresponding to the touch signal; and
  in accordance with the determination that there is no second contact on the portion of the wearable device different from the touchscreen:
    in accordance with a determination that the one or more parameters of the touch signal exceeds the one or more second touch detection thresholds, register a touch corresponding to the touch signal; and
    in accordance with a determination that the one or more parameters of the touch signal fail to exceed the one or more second touch detection thresholds, forgo registering a touch corresponding to the touch signal.

15. The non-transitory computer readable storage medium of claim 13, wherein the one or more first touch detection thresholds are greater than the one or second touch detection thresholds.

16. The non-transitory computer readable storage medium of claim 13, wherein the one or more first touch detection thresholds comprise a first touch density threshold and the one or more second touch detection thresholds comprise a second touch density threshold, wherein the instructions, when executed by the wearable device, further cause the processor to:
  calculate a touch density from the touch signal;
  in accordance with the determination that there is the second contact on the portion of the wearable device different from the touchscreen, determine whether the one or more parameters of the touch signal exceeds the one or more first touch detection thresholds by comparing the calculated touch density to the first touch density threshold; and
  in accordance with the determination that there is no second contact on the portion of the wearable device different from the touchscreen, determine whether the one or more parameters of the touch signal exceeds the one or more second touch detection thresholds by comparing the calculated second touch density to the second touch density threshold.

17. The non-transitory computer readable storage medium of claim 16, wherein the touch density is calculated based on a dimension of a touch area and peak capacitance values from the touch area.

18. The method of claim 8, wherein the sensor comprises a proximity sensor, a physiological sensor, an optical sensor, or a capacitive sensor.

19. The method of claim 8, wherein the sensor and the touchscreen are on opposite surfaces of the wearable device.

20. The non-transitory computer readable storage medium of claim 13, wherein the wherein the sensor comprises a proximity sensor, a physiological sensor, an optical sensor, or a capacitive sensor and wherein the sensor and the touchscreen are on opposite surfaces of the wearable device.

* * * * *